June 16, 1931.  J. SNYDER  1,810,228
CHICKEN TREATER
Filed March 8, 1928
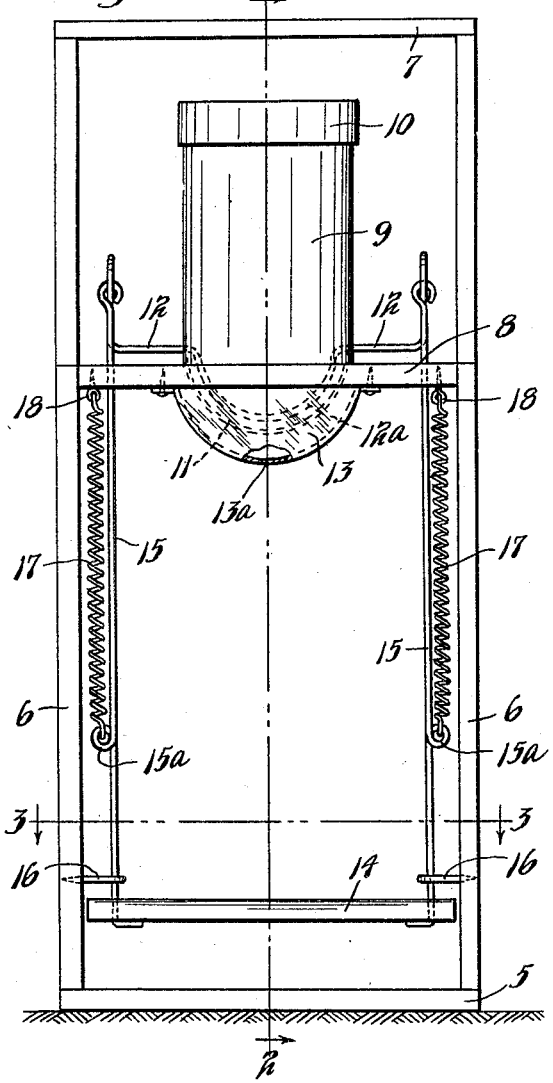
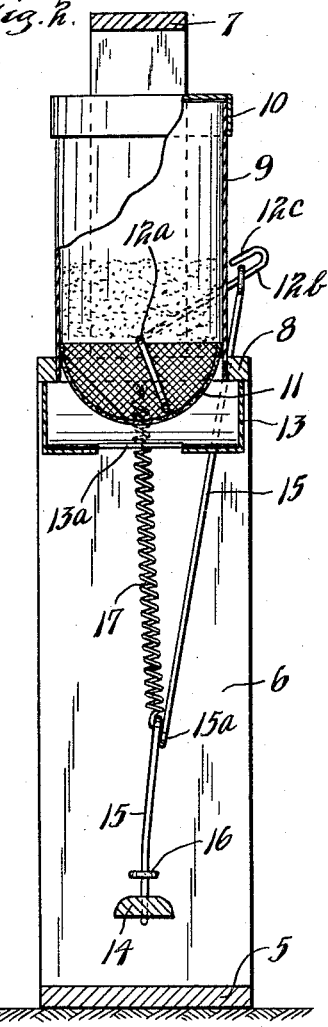
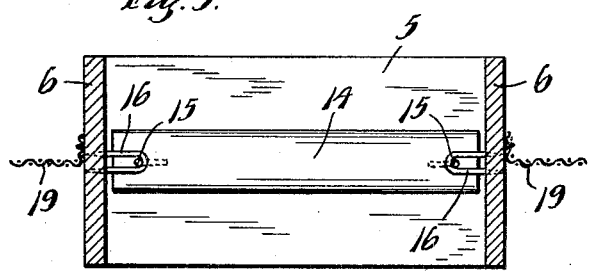
INVENTOR.
JOE SNYDER.
BY HIS ATTORNEYS Patented June 16, 1931

1,810,228

UNITED STATES PATENT OFFICE

JOE SNYDER, OF IROQUOIS, SOUTH DAKOTA

CHICKEN TREATER

Application filed March 8, 1928. Serial No. 259,990.

This invention relates to a machine for treating fowls with insecticide. Fowls are often infested with lice, mites, and other vermin and it is desirable to treat them with various insecticides.

It is an object of this invention to provide a simple and efficient device for showering or sprinkling the insecticide onto the fowls.

It is a further object of the invention to provide a simple and efficient device having means for carrying the insecticide, and means operated by the fowls for distributing the same onto the fowls.

It is more specifically an object of the invention to provide a device for treating fowls with insecticide, comprising a frame having spaced vertically extending side members, a container at the upper portion of said frame for the insecticide, a bar extending between said side members adjacent their lower portions adapted to support the fowls as they step or jump thereon, means for distributing said insecticide and means connected to said bar for operating said last mentioned means.

These and other objects and advantages of the invention will be fully set forth in the following description made in connection with the accompanying drawings, in which like reference characters refer to similar parts throughout the several views and in which:—

Fig. 1 is a view in side elevation of the device;

Fig. 2 is a vertical section taken on line 2—2 of Fig. 1 as indicated by the arrows; and Fig. 3 is a horizontal section taken on line 3—3 of Fig. 1, as indicated by the arrows.

Referring to the drawings, a device is shown comprising a frame having a base 5, spaced side members 6 secured to said base and extending vertically therefrom, said side members being connected at their tops by the cross member 7. The side pieces 6 are connected some distance below the member 7 by a cross member 8. A container 9 is shown supported on member 8 having a lid or cover 10. Said container at its lower end is fitted into an opening in member 8. While this container may take various forms, in the embodiment of the invention illustrated it is shown as cylindrical. The container has disposed therebelow and forming a bottom therefor, a screen 11 illustrated as semi-spherical in form and secured to container 10 at its open side by any suitable means. An agitator illustrated as a rod or wire 12 extends through the sides of container 9, being journaled therein, and has a central semi-circular portion 12a extending along the inner surface of member 11. The member 12 has angularly extending arms 12b at its ends, having their ends reversely bent to form hooks 12c. A semi-cylindrical casing 13 is secured to the under side of member 8, enclosing the portion of member 11 which projects through said opening in member 8. The casing 13 has an opening 13a centrally thereof, which is thus disposed substantially centrally of the frame member 6. A bar 14 extends between the side members 6 adjacent their lower ends, being somewhat shorter than the distance between said side members, said bar 14 having a rounded upper surface. The bar 14 has rods 15 extending vertically therethrough adjacent its ends, which have their lower ends bent substantially at right angles under said bar and in contact with the under surface thereof. The rods 15 extend through guiding staples 16 driven into the inner sides of said members 16. The rods 15 extend upwardly and have loops 15a formed therein, some distance above bar 14, and then extend laterally and have eyelets at their upper ends engaged over the arms 12b. Springs 17 are connected at their lower ends to the loops 15a and at their upper ends to screw eyes 18 secured in the under surface of member 8. A screen or other barrier 19 may be secured at the outer side of each of said side pieces 6 and extend therefrom.

In operation of the device, the fowls will pass through the opening formed by the frame between barriers 19 and will then pass between the side pieces 6 of said frame. The fowls will jump up onto bar 14 or step thereon and when this is done, the weight of the fowl will cause said bar to descend against the tension of spring 17. This movement of the bar 14 pulls downward on the rods 15 and swings the arms 12b through a considerable angle. This causes a wiping movement of the portion 12a across the surface of the screen 11. The container 9 will contain insecticide in the form of a dust or powder and when the movement of member 12a occurs, a part of this insecticide will pass through the screen 11 and drop down in a shower into casing 13. This shower will pass out through the opening 13a, drop downward, and be distributed on the fowl perched on the bar 14. The device is constructed and arranged so that a shower of insecticide is effectively distributed on the fowl, particularly about the head and neck thereof. The fowl does not remain on the perch, but is only on the same temporarily. The springs 17 pull the rods 15 and bar 14 upwardly as the weight is removed from the perch 14, and the member 12a again slides over the surface of the screen 11. The two movements of the member 12a are made very close together so that the shower of insecticide is distributed long enough to very effectively treat the fowl about the head and body thereof.

From the above description it is seen that applicant has provided a very simple and efficient device for distributing insecticide on fowls. The device is easily operated and being operated by the fowls, requires no attention by any person, except when the supply of insecticide is to be renewed. The device is very simple in construction and is easily made and assembled. The same has been demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A device for treating fowls with insecticide having in combination, a frame having spaced side members, a member extending between said side members some distance from the top thereof, a container for insecticide mounted on said last mentioned member, said container having a substantially semi-spherical screen bottom, a substantially semi-circular oscillating agitator movable over said bottom, a bar extending between said side members adjacent their lower ends and vertically movable therebetween, members connected to said bar and to said agitator, and springs connected to said last mentioned members and to said frame for raising said bar after the same has been depressed by a fowl.

2. A device for treating fowls with insecticide powder having in combination, a frame, a container for said insecticde powder mounted at the upper portion of said frame, a screen member below said container and forming the bottom thereof, an agitator movable over said screen, a vertically movable member below said screen and spaced above the bottom of said frame adapted to have fowls supported thereon, means pivotally connecting said movable member and agitator whereby when a fowl is supported on said movable member a shower of powder will be moved from said screen by said agitator, a spring for returning said movable member to its upper position and a casing below said screen having a central aperture for directing the shower of powder delivered from said screen into a certain area.

3. A device for treating fowls with insecticide powder having in combination, a frame having spaced vertical side members a container for insecticide mounted at the upper porton of said frame, means for discharging powder downwardly in a shower at the bottom of said container, comprising a screen having a curved lower end and forming the bottom of said container, a shaft extending transversely of said screen and journaled at the sides thereof, a bail carried on said shaft and arranged to sweep over the inner surface of said screen in close proximity thereto, said shaft having an arm at its outer end extending at an angle thereto, a rod secured to said arm, a vertically movable bar to which said rod is secured and a spring for lifting said bar and rod, said spring being distendable by the weight of a fowl on said bar.

In testimony whereof I affix my signature.

JOE SNYDER.